United States Patent [19]
Konrad

[11] Patent Number: 5,402,393
[45] Date of Patent: Mar. 28, 1995

[54] NON-INVASIVE ACOUSTIC VELOCIMETRIC APPARATUS AND METHOD

[75] Inventor: William L. Konrad, Niantic, Conn.

[73] Assignee: The United States of America as represented by the Secretary of the Navy, Washington, D.C.

[21] Appl. No.: 209,284

[22] Filed: Mar. 14, 1994

[51] Int. Cl.$^6$ ............................................. G01S 15/58
[52] U.S. Cl. ..................................................... 367/89
[58] Field of Search ....................... 367/89, 90, 91, 92, 367/902

[56] References Cited
U.S. PATENT DOCUMENTS
3,388,372  6/1968  Witz ...................................... 367/89

*Primary Examiner*—Daniel T. Pihulic
*Attorney, Agent, or Firm*—Michael J. McGowan; Prithvi C. Lall; James M. Kasischke

[57] ABSTRACT

A first projector that generates a beam of acoustic energy having a first frequency, and a second acoustic projector that generates a beam of acoustic energy having a second frequency are provided. Interaction between the intersecting beams and particles present in the aquatic environment cause radiation of a third frequency at the region of beam intersection. The third frequency acoustic waves returned from the non-linear acoustic radiating area are monitored at a hydrophone, and the travel time of sound from the projectors to the hydrophone is determined. Successive readings can be made at various depths to obtain a velocity profile. Velocimetry can thus be accomplished free from any need to lower a tethered physical velocimeter into the depths.

9 Claims, 1 Drawing Sheet

NON-INVASIVE ACOUSTIC VELOCIMETRIC APPARATUS AND METHOD

STATEMENT OF GOVERNMENT INTEREST

The invention described herein may be manufactured and used by or for the government of the United States of America for governmental purposes without the payment of any royalties thereon or therefor.

BACKGROUND OF THE INVENTION (1) Field of the Invention

This invention is directed to the field of acoustic velocimetry, and more particularly, to a non-invasive acoustic velocimeter and a non-invasive method of acoustic velocimetry.

(2) Description of the Prior Art

In submarine sonar applications, vessels are presently detected using active sonar where an acoustic pulse of a given frequency or frequencies is reflected off the target vessel and returns to the sonar system at essentially the same frequency or frequencies. Accurate knowledge of the speed of sound in the marine environment is necessary to obtain accurate positioning from active sonar. The speed of sound in a fluid is dependent on the density of the fluid which is related to its temperature, salinity, and pressure. Various inhomogeneities and interfering reflections can also limit the performance of active sonar systems. Consequently, it is desirable to determine a profile of the velocity of sound at various points within the marine environment to obtain accurate sonar readings.

Conventional acoustic or sonar remote sensing velocimeters typically use an invasive technique wherein a velocimeter having an acoustic source and a receiving unit in close proximity to each other is lowered on a cable to the water depth where the sound velocity is to be measured. Sound velocity is determined by measuring the travel time between the source and receiver while the velocimeter is being lowered or raised. The velocimeter known in the prior art requires physical lowering of the measuring unit to the desired depth. One of the problems created by physical lowering of the measuring unit is the time required to deploy the device, lower it to the required depth, raise the device back to the location of the vessel, and stow the device aboard the vessel, These tasks become even more difficult if the deploying vessel is a submarine. Furthermore, the deploying vessel must be moved to obtain velocimetric readings along a horizontal profile.

SUMMARY OF THE INVENTION

Accordingly, it is a general purpose and object of the present invention to provide an apparatus and method for determining an acoustic velocity profile in a fluid.

It is a further object that such apparatus and method be non-invasive and therefore not require that the measuring apparatus be passed through the fluid at the point of measurement.

These objects are accomplished with the present invention by providing a first projector that generates a beam of acoustic energy having a first frequency, and a second acoustic projector that generates a beam of acoustic energy having a second frequency. Interaction between the intersecting beams and particles present in the marine environment cause radiation of a third frequency at the region of beam intersection. The third frequency acoustic waves returned from the non-linear acoustic radiating area are monitored. These non-linear intermodulation products are monitored at a hydrophone, and the travel time of sound from the projectors to the hydrophone is determined. Successive readings can be made at various depths to obtain a velocity profile, whereby velocimetry is accomplished free from any need to lower a tethered physical velocimeter into the depths.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DESCRIPTION OF THE PREFERRED EMBODIMENT

Figure 1:
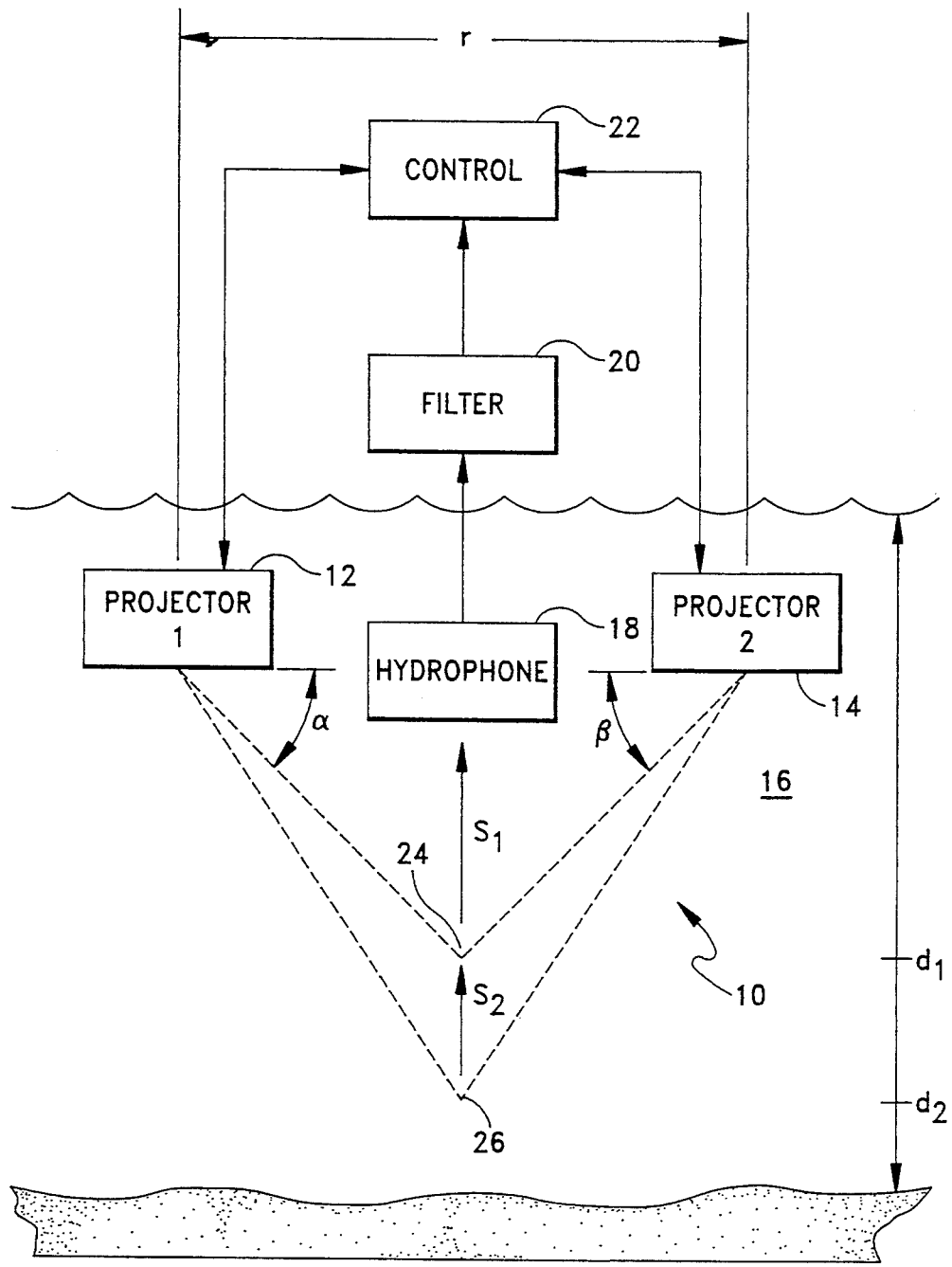
FIG. 1 is a schematic diagram illustrating one embodiment of the novel method and apparatus exploiting acoustic non-linearity to determine velocimetry in a marine environment.

Referring now to FIG. 1, there is shown the acoustic velocimetry apparatus 10 of the current invention. A first acoustic energy projector 12 and a second acoustic energy projector 14 are placed a known distance r apart under the surface of a fluid 16. A hydrophone 18 or another receiver of acoustic energy is preferably provided on the same platform as projectors 12 and 14, but all components of this invention can be supported individually. Hydrophone 18 is coupled to a filter 20 which is tuned to a selected intermodulation product to be described. Filter 20, in turn, is connected to a controller 22. Controller 22 is also joined to projectors 12 and 14 to control projectors 12 and 14 and to measure the time between beam origination and receipt of the intermodulation product.

Projectors 12 and 14 are mounted to allow each of them to be actuated to project an acoustic beam at a selected angle shown herein by $\alpha$ and $\beta$ respectively. The acoustic beams are illustrated in FIG. 1 by dashed lines. Projectors 12 and 14 project these beams of acoustic energy at different frequencies, for example 117 kilohertz for projector 12 and 137 kilohertz for projector 14. These two frequencies have been chosen to provide an average source frequency to difference frequency ratio of between three and twenty to facilitate detection of the difference frequency. Furthermore, these frequencies provide a minimal acoustic beam spread of 2°–3°. The acoustic beams produced thereby intersect at different depths depending on the angles $\alpha$ and $\beta$ of projectors 12 and 14 as illustrated by points 24 and 26 at the corresponding depths marked $d_1$ and $d_2$. Depth of intersection is calculated by triangulation in which the selected angles of projection $\alpha$ and $\beta$ are used with the known separation distance r between projectors 12 and 14.

At regions of intersection 24 and 26, the projected beams of acoustic energy non-linearly interact with particles present in seawater to return corresponding intermodulation products, designated $S_1$ and $S_2$. The term "particles" as used in this document refers to discontinuities in an aquatic or marine environment such as gas bubbles, cavitation bubbles, plankton or debris. Note that in the absence of particles, non-linearity is not exhibited and no intermodulation product will be returned. The intermodulation product can be either the sum or difference frequency of the projected acoustic beams; however, the difference frequency is preferred because its lower frequency is transmitted through seawater with fewer losses. Signals $S_1$ and $S_2$ are received by hydrophone 18 where they are transmitted to controller 22 via filter 20. Filter 20 is tuned to the selected intermodulation product such as the difference frequency intermodulation product to filter out other ambient noise such as background noise or radiated noise at the frequencies of the projected acoustic beams.

In order to obtain a velocity profile, a series of velocity readings must be taken. To obtain a first velocity reading, controller 22 signals projectors 12 and 14 to each emit a beam. The two beams intersect each other at a known depth $d_1$ at a first point 24. Hydrophone 18 receives the sound $S_1$ created at the region of intersection by the action of the two beams on particles in fluid 16. The return time $t_1$ from the intersection depth $d_1$ to hydrophone 18 is determined by controller 22. A second velocity reading is obtained at a second known depth $d_2$ from hydrophone 18 by changing the angle of projectors 12 and 14 to cause the acoustic beams to intersect at a second point 26. Controller 22 then records return time $t_2$ of the sound $S_2$ from the second region of intersection 26 at $d_2$. The velocity through the fluid at the region between the two points of intersection is the velocity calculated from the difference in depths $d_1$ and $d_2$, and return times $t_1$ and $t_2$. Multiple iterations of this process can be performed to obtain the entire velocity profile between a desired region and hydrophone 18. The resolution of the velocity profile thus obtained is limited by the number of measurements performed.

The known distance r, the angles of the projectors $\alpha$ and $\beta$, and the measured times $t_1$ and $t_2$ at which the signals $S_1$, $S_2$ are received by hydrophone 18 enable calculation of the velocity of the marine environment at the corresponding depths $d_1$, $d_2$ in a manner that is free from the heretofore known technique that required lowering a tethered velocimeter into the marine environment.

In the above embodiment, the frequency and amplitude of projectors 12 and 14 are selected to minimize the generation of intermodulation products in the medium in order to maximize the return signal to reverberation ratios from the region where the beams intersect. Depths $d_1$ and $d_2$ have been used to illustrate the most common use of the invention herein, but it is understood that the beams can be projected horizontally as well as vertically to obtain a horizontal velocity profile.

In light of the above, it is therefore understood that within the scope of the appended claims, the invention can be practiced otherwise than as specifically described.

What is claimed is:

1. An apparatus for determining the acoustic velocity in a fluid at depth comprising:
   a first acoustic projector submerged in said fluid to project a first narrow acoustic beam having a first preselected frequency through said fluid;
   a second acoustic projector submerged in said fluid to project a second narrow acoustic beam having a second preselected frequency through said fluid, said second acoustic beam intersecting said first acoustic beam, said first and second beams producing a non-linear intermodulation product frequency by interaction with particles disposed in said fluid;
   a hydrophone submerged in said fluid for receiving sounds from said fluid;
   a filter joined to said hydrophone for filtering said sounds received by said hydrophone to receive a sound having a preselected frequency; and
   a controller joined to said filter to detect said preselected frequency.

2. An apparatus as in claim 1 wherein said controller is further joined to said first acoustic projector and to said second acoustic projector to measure the time between projection of said first and second beams and receipt of said preselected frequency.

3. An apparatus as in claim 2 wherein:
   said first acoustic projector is actuable to project said first beam at a first selected angle; and
   said second acoustic projector is actuable to project said second beam at a second selected angle.

4. An apparatus as in claim 3 wherein said preselected frequency filtered by said filter is the sum frequency of said first preselected frequency and said second preselected frequency.

5. An apparatus as in claim 3 wherein said preselected frequency filtered by said filter is the difference frequency of said first preselected frequency and said second preselected frequency.

6. A method for calculating the velocity of sound in a fluid comprising the steps of:
   emitting a first acoustic beam having a first preselected frequency into said fluid;
   emitting a second acoustic beam having a second preselected frequency into said fluid, said second beam intersecting said first beam;
   receiving an intermodulation product at a hydrophone disposed in said fluid, said intermodulation product being generated by the interaction of said first beam and said second beam at the region of intersection with particles disposed in said fluid;
   measuring the return time of said intermodulation product produced by said intersection of said beams; and
   calculating the velocity of sound between said intersection of said beams and said hydrophone from said measured return time.

7. The method of claim 6 further comprising the step of determining the depth of beam intersection.

8. The method of claim 7 wherein the step of determining the depth of beam intersection comprises:
   determining the angle of emitting said first beam;
   determining the angle of emitting said second beam;
   determining the distance between the origin said first beam and said second beam; and
   calculating the distance to the point of intersection of the beams.

9. The method of claim 7 further comprising the steps of
   determining the velocity of sound between a plurality of depths and said hydrophone;
   calculating the velocity in a given region by subtracting known times and distances in regions between the given region and said hydrophone.

* * * * *